(12) United States Patent
Peters et al.

(10) Patent No.: US 9,216,669 B2
(45) Date of Patent: Dec. 22, 2015

(54) FITTING FOR A VEHICLE SEAT, AND VEHICLE SEAT

(71) Applicant: Johnson Controls Components GmbH & Co. KG, Kaiserslautern (DE)

(72) Inventors: Christoph Peters, Wermelskirchen (DE); Uwe Assmann, Remscheid (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 14/375,608

(22) PCT Filed: Jun. 21, 2013

(86) PCT No.: PCT/EP2013/062959
§ 371 (c)(1),
(2) Date: Jul. 30, 2014

(87) PCT Pub. No.: WO2014/001208
PCT Pub. Date: Jan. 3, 2014

(65) Prior Publication Data
US 2014/0368016 A1    Dec. 18, 2014

(30) Foreign Application Priority Data

Jun. 26, 2012    (DE) .......................... 10 2012 012 847

(51) Int. Cl.
*B60N 2/235*    (2006.01)
*B60N 2/68*     (2006.01)
*B60N 2/44*     (2006.01)

(52) U.S. Cl.
CPC ............ *B60N 2/2356* (2013.01); *B60N 2/4435* (2013.01); *B60N 2/682* (2013.01)

(58) Field of Classification Search
CPC .......................... B60N 2/2356; B60N 2/4435
USPC .............. 297/366, 362, 463.1, 354.1, 367 P, 297/367 R
See application file for complete search history.

(56) References Cited

U.S. PATENT DOCUMENTS

| | | | |
|---|---|---|---|
| 7,100,987 B2 | 9/2006 | Volker et al. | |
| 7,571,963 B2 * | 8/2009 | Peters et al. | 297/367 R |
| 7,614,700 B2 * | 11/2009 | Peters | 297/367 R |
| 7,677,667 B2 * | 3/2010 | Peters et al. | 297/367 R |
| 2012/0104825 A1 * | 5/2012 | Naughton | 297/463.1 |
| 2012/0169105 A1 * | 7/2012 | Assmann et al. | 297/367 P |

(Continued)

FOREIGN PATENT DOCUMENTS

| | | |
|---|---|---|
| DE | 10 2005 046 807 B3 | 11/2006 |
| DE | 10 2006 015 560 B3 | 8/2007 |

(Continued)

*Primary Examiner* — Chi Q Nguyen
(74) *Attorney, Agent, or Firm* — McGlew and Tuttle, P.C.

(57) ABSTRACT

A fitting for a vehicle seat has a first fitting part and a second fitting part that relatively rotate about an axis. A toothed rim (17) is on the first fitting part and guide segments (14) are on the second fitting part. Bars (16) are guided by the guide segments between an unlocked state and a locked state, interacting with the toothed rim. A spring-loaded, rotatably mounted eccentric (27) urges the bars to interact with the toothed rim. A rotatable driver (21) rotates the eccentric. A fastening ring (24) is connected to the driver. A cam (24n) is formed on the fastening ring and bears in the circumferential direction against a driver cam (21 f) of the driver. The fastening ring has a collar (24b) with a passage (24d) about the axis. The cam is formed within the passage such that it is oriented in the radial direction towards the axis.

18 Claims, 4 Drawing Sheets

(56) References Cited

U.S. PATENT DOCUMENTS

2014/0110984 A1* 4/2014 Assmann et al. .......... 297/354.1
2014/0132053 A1 5/2014 Schüler et al.
2014/0333114 A1* 11/2014 Peters ........................ 297/463.1
2014/0346832 A1* 11/2014 Jung et al. .................... 297/362
2015/0015044 A1* 1/2015 Teufel et al. .................. 297/366

FOREIGN PATENT DOCUMENTS

| DE | 10 2008 024 853 A1 | 11/2009 |
| DE | 20 2011 106 338 U1 | 11/2011 |
| DE | 10 2011 010 700 A1 | 8/2012 |
| WO | 2009/100125 A2 | 8/2009 |
| WO | 2011/160771 A1 | 12/2011 |

* cited by examiner

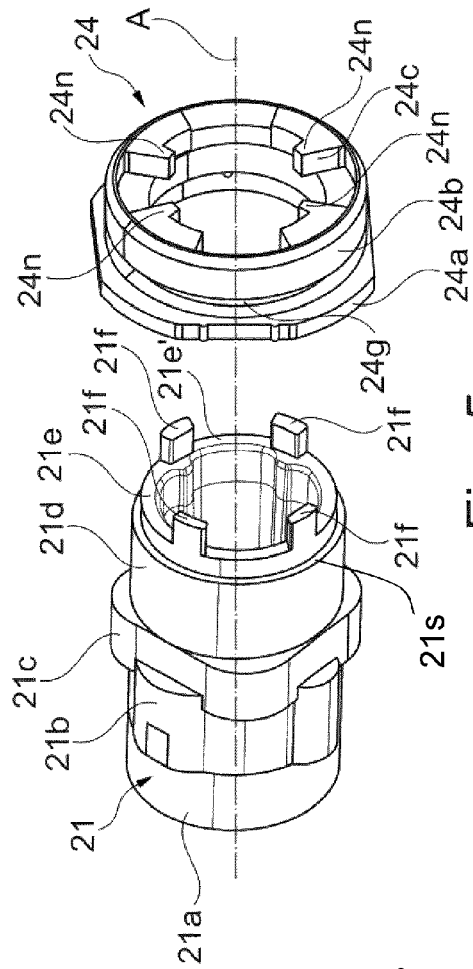
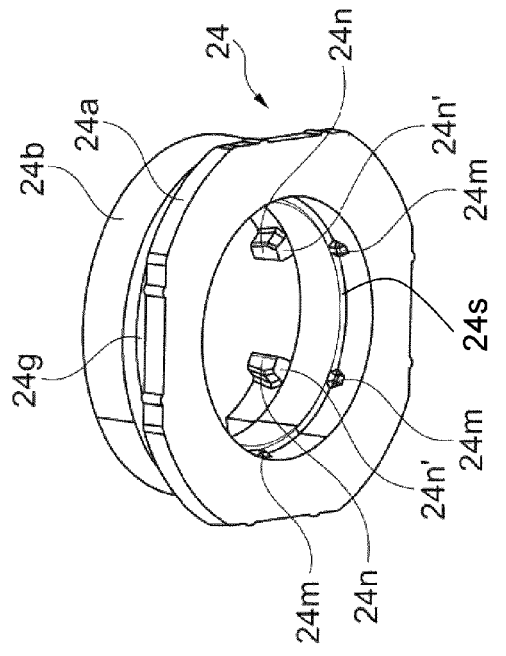
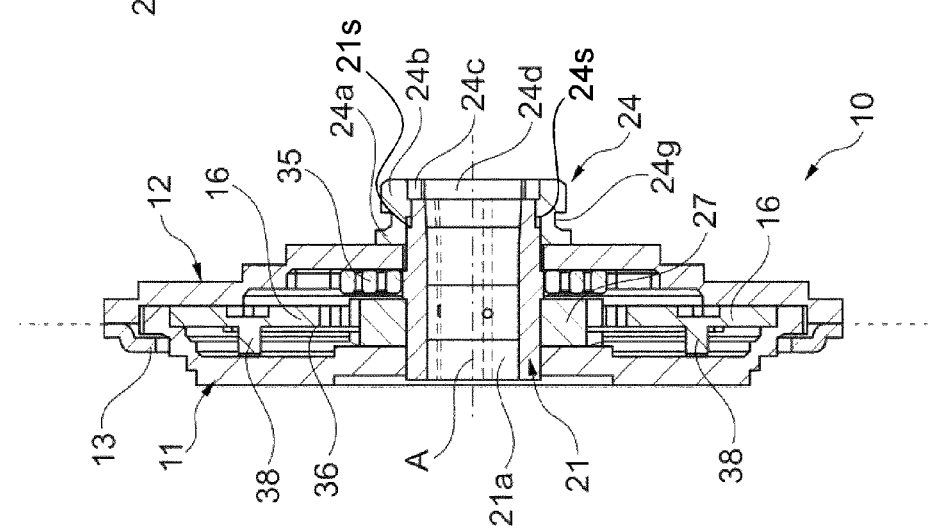
Fig. 5
Fig. 6
Fig. 4

FITTING FOR A VEHICLE SEAT, AND VEHICLE SEAT

CROSS REFERENCE TO RELATED APPLICATIONS

This application is a U.S. National Phase Application of International Application PCT/EP2013/062959 filed Jun. 21, 2013 and claims the benefit of priority under 35 U.S.C. §119 of German Patent Application DE 10 2012 012 847.9 filed Jun. 26, 2012, the entire contents of which are incorporated herein by reference.

FIELD OF THE INVENTION

The invention relates to a fitting for a vehicle seat, in particular for a motor vehicle seat, having a first fitting part and a second fitting part which can be rotated about an axis relative to one another, wherein a toothed rim is formed on the first fitting part and guide segments are formed on the second fitting part, and locking bars are displaceably guided between a locked state and an unlocked state by the guide segments and which cooperate with the toothed rim in the locked state in order to lock the fitting, a spring-loaded, rotatably mounted eccentric which acts on the locking bars in order to bring them into cooperation with the toothed rim, a rotatably mounted driver for rotating the eccentric, a fastening ring connected fixedly to the driver and a cam formed on the fastening ring and bears in the circumferential direction against at least one driver cam of the driver.

BACKGROUND OF THE INVENTION

A generic fitting is disclosed in DE 10 2008 024 853 A1, the fastening ring thereof having three axially aligned projections which engage in three axial recesses of a driver and thus determine the angular position of the fastening ring relative to the driver. One respective edge formed on the projections in the circumferential direction bears in this case against a surface of the driver and is ultrasonically welded in this region. It is a drawback that a circumferential ultrasonic welded connection is not produced, as it is only possible to carry out the welding in the region of the projections. Additionally, as the relevant components are simultaneously pushed together axially, weld deposit is produced during the ultrasonic welding, said weld deposit not being able to be completely removed from the recesses.

DE 20 2011 106 338 U1 also discloses a fitting having a fastening ring. The fastening ring, however, does not have any means which produce a defined angular position of the fastening ring relative to the driver.

A complex lever mechanism for unlocking a fitting is disclosed in U.S. Pat. No. 7,100,987 B2. A crank drive of the lever mechanism drives a driver of the fitting. A separately configured fastening ring connected to the driver is not a component of the fitting.

SUMMARY OF THE INVENTION

An object of the invention is to improve a fitting of the type mentioned in the introduction, in particular to ensure by simple means the angular position of the fastening ring relative to the driver and to provide the possibility of an optional, circumferential ultrasonically welded seam between the fastening ring and the driver and by using such a fitting to provide a vehicle seat which is cost-effective and has a high degree of strength and low tolerances.

According to the invention, a fitting is provided for a vehicle seat, in particular for a motor vehicle seat, comprising a first fitting part and a second fitting part which can be rotated about an axis relative to one another, wherein a toothed rim is formed on the first fitting part and guide segments are formed on the second fitting part. Locking bars are displaceably guided between a locked state and an unlocked state by the guide segments and cooperate with the toothed rim in the locked state in order to lock the fitting. A spring-loaded, rotatably mounted eccentric acts on the locking bars in order to bring the locking bars into cooperation with the toothed rim. A rotatably mounted driver is provided for rotating the eccentric. A fastening ring is configured separately from the driver and is connected fixedly to the driver. At least one first cam is formed on the fastening ring and bears in the circumferential direction against at least one driver cam of the driver. The fastening ring has a collar with a passage about the axis and the at least one first cam is formed within the passage such that it is oriented in the radial direction toward the axis.

According to another aspect of the invention, a vehicle seat in particular a motor vehicle seat is provided having at least one fitting according to the invention.

As the fastening ring has a collar with a passage about the central axis and at least one first cam is formed inside the passage in the radial direction aligned with the central axis, a simple angular centering may be provided during the mounting process, in particular when pushing the fastening ring onto the driver. Additionally, there is the possibility of producing a circumferential ultrasonically welded seam between the fastening ring and the driver.

For particularly effective angular centering during the pushing-on process, at least one driver cam protrudes in the axial direction from a front face of the driver and cooperates with the at least one first cam of the fastening ring. To this end, the at least one driver cam has a centering surface which in the circumferential direction bears against a bearing surface of the at least one first cam of the fastening ring. In this case, a centering angle of 6°+/−4°, preferably of 4°+/−1°, is provided between the centering surface and the bearing surface, at least in regions. A slight relative angular deviation about the central axis which is potentially present may be compensated by means of this centering angle, by the bearing surfaces of the first cam inclined about the centering angle when pushed on in the axial direction sliding on the centering surfaces of the driver cams and, as a result, the fastening ring being rotated into the correct angular position.

Preferably, the bearing surface of the at least one first cam of the fastening ring is inclined in the axial direction relative to a line parallel to the axis in a first partial portion and is configured to extend parallel to the axis in a second partial portion. The centering angle is thus only present in the first partial portion. The centering surface and the bearing surface of the fully mounted fitting only bear against one another in the second partial portion without the centering angle. As a result, in the fully mounted state, an axial force component which could move the fastening ring away from the driver does not act on the fastening ring.

A centering of the fastening ring in the radial direction when the fastening ring is first pushed onto the driver may be improved by the driver cam at its end remote from the front face of the driver having a circumferential chamfer on its internal edge.

As at least two cam pairs are provided, consisting in each case of one of the driver cams and one of the first cams, said cam pairs bearing against one another in the respective opposing circumferential direction, preferably by the at least two cam pairs being configured mirror-symmetrically relative to one another, the angular centering acts in both circumferential directions.

The fastening ring in the radial direction may be aligned particularly effectively relative to the driver, by the fastening ring preferably having three or more second cams which bear against the driver in the radial direction. Three second cams provide a statically defined support according to the principle of a tripod. A doubling of the number of second cams to six second cams, which are preferably distributed evenly over the circumference, provides an optimal alignment even in the event of changing load directions.

Ultrasonic welding is a preferred joining method for connecting the fastening ring to the driver, as it is cost-effective and yet has high strength. Particularly good welding results may be achieved by an edge of the fastening ring circulating around the central axis bearing against an annular surface of the driver circulating around the central axis, and being welded in said bearing region. The weld deposit produced during the ultrasonic welding process may be advantageously collected as a gap is present between the fastening ring and the driver adjacent to the at least one second cam, said gap being able to be filled with the weld deposit.

The invention is described in more detail hereinafter with reference to an advantageous exemplary embodiment shown in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
FIG. 4 is an axial section through the fitting;
FIG. 5 is an exploded view of the driver and fastening ring;
FIG. 6 is a perspective view of the fastening ring.

DESCRIPTION OF THE PREFERRED EMBODIMENTS

Figure 2:
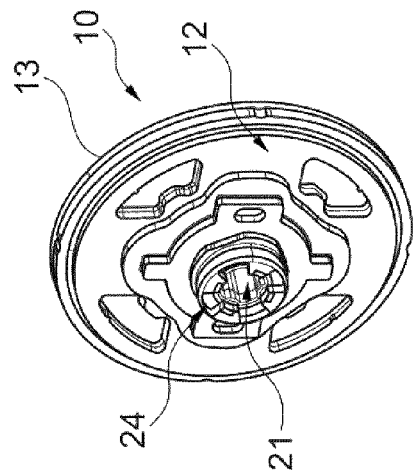
FIG. 2 is a perspective view of a fitting.
Figure 1:
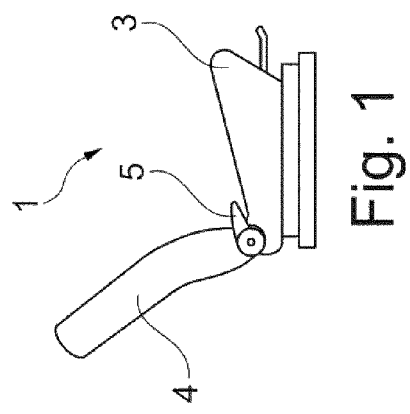
FIG. 1 is a schematic view of a vehicle seat.
Figure 3:
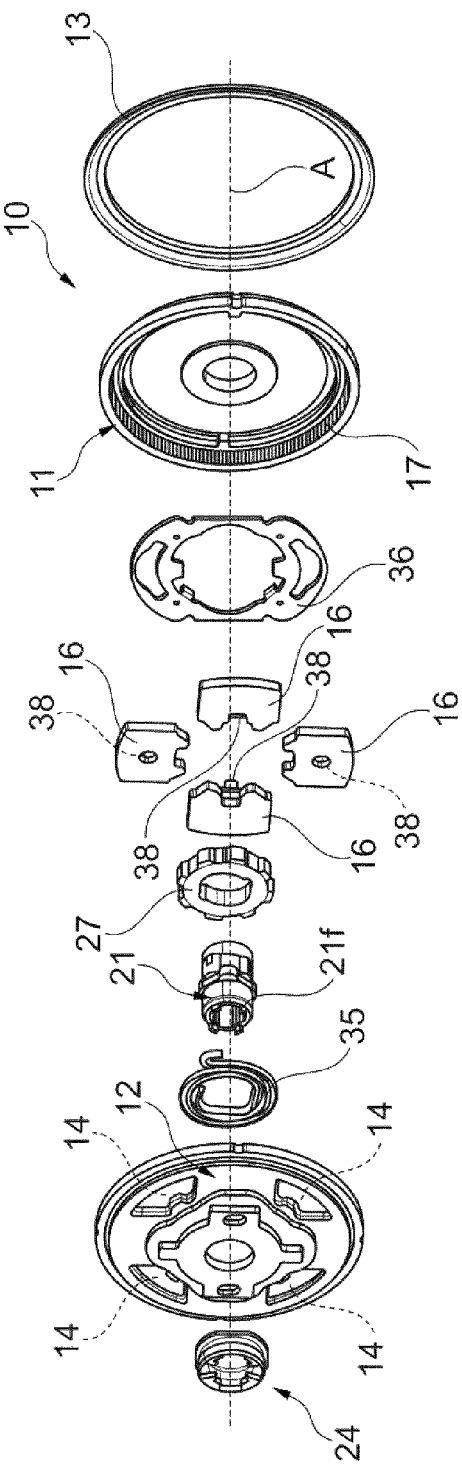
FIG. 3 is an exploded view of the fitting.

Referring to the drawings in particular, vehicle seat 1 for a motor vehicle has a seat part 3 and a backrest 4 which is attached to the seat part 3 in a pivotable manner relative to the seat part 3 by means of one respective fitting 10 on both sides of the vehicle seat 1.

The fitting 10 has a first fitting part 11 and a second fitting part 12 which can be rotated about an imaginary central axis A relative to one another. The axis A is arranged horizontally in the transition region between the seat part 3 and the backrest 4 and defines the directional information of a cylinder coordinate system used. The two fitting parts 11 and 12 may in each case approximately describe a circular disk shape. Both fitting parts 11 and 12 preferably consist of metal, in particular steel, which may be at least partially hardened. For receiving the axially acting forces, i.e. for axially holding together the fitting parts 11 and 12, a clasping ring 13 is provided. The clasping ring 13 preferably consists of metal, in particular steel, which is preferably unhardened. The clasping ring 13 preferably has a substantially planar annular shape but in an alternative embodiment may be profiled in an L-shape with a cylinder portion and on the front face a planar annular portion.

The clasping ring 13 is fixedly connected to one of the two fitting parts 11 and 12, in the present case in an outer annular portion to the second fitting part 12, for example by means of laser welding or by means of a further fastening technique known per se. By means of an internal annular portion, which is arranged in a plane perpendicular to the axial direction, optionally by the interposition of a sliding ring, the clasping ring 13 encompasses the first fitting part 11 in the radial external edge region thereof, without hindering the relative movement of the two fitting parts 11 and 12. Additionally, the internal surfaces of the two fitting parts 11 and 12 facing one another are protected from the penetration of foreign bodies and soiling and damage.

The clasping ring 13 and the fitting part 12 connected fixedly thereto thus clasp the fitting part 11 which is movable relative thereto. In terms of construction, therefore, the two fitting parts 11 and 12 form together (with the clasping ring 13) a disk-shaped unit.

When mounting the fitting 10, the first fitting part 11 is connected, for example, to the backrest 4. The second fitting part 12 is then fixedly connected to the structure of the seat part 3, i.e. fixed to the seat part. In the present case, the second fitting part 12 is welded to a seat part adapter by means of laser welding. However, the assignments of the fitting parts 11 and 12 may also be reversed, i.e. the first fitting part 11 could then be connected fixedly to the seat part and the second fitting part 12 to the backrest 4. The fitting 10 is located in the flux of force between the backrest 4 and the seat part 3.

The fitting 10 is configured as a latching fitting in which the first fitting part 11 and the second fitting part 12 may be locked together, as described for example in DE 10 2006 015 560 B3.

The second fitting part 12 has—in the present case four—guide segments 14 which with straight guide surfaces in pairs guide one respective locking bar 16 laterally in the radial direction. The locking bars 16—in the present case a total of four—are arranged offset—in the present case respectively by 90°—to one another in a constructional space defined between the two fitting parts 11 and 12. The locking bars 16 are provided on their radial external end with a toothing which may come (fall) into engagement with a toothed rim 17 of the first fitting part 11 configured as a ring gear. When the toothed rim 17 and the locking bars 16 cooperate, the fitting 10 is locked.

The first fitting part 11 is arranged in a recess of the second fitting part 12 and is encompassed radially externally thereby, whereby the two fitting parts 11 and 12 bear one another. In this case, the radial external edge region of the first fitting part 11 is arranged with the toothed rim 17 in the radial direction between the guide segments 14 and the radial external edge region of the second fitting part 12 (serving to mount the first fitting part 11). In the case of high loads, for example in the event of a crash the first fitting part 11—after deformation—may come to bear with its toothed rim 17 against the guide segments 14 which are located closer in the loading direction, said guide segments having surfaces correspondingly (concentrically) curved relative to the toothed rim 17. This increases the strength of the fitting 10.

The first fitting part 11 may be mounted in the second fitting part 12. However, the relationships could be exactly reversed, i.e. the second fitting part 12 may be mounted on the first fitting part 11. In principle, however, both arrangements are equivalent.

A driver 21 is arranged in the center of the fitting 10. The driver 21 extends in the direction of the axis A and is provided about the axis A with a through-opening. In the present case, the driver 21 is a one-piece plastics component. At its end oriented toward the first fitting part 11, the driver 21 has a first cylinder portion 21a, and with the outer surface thereof the driver 21 being rotatably mounted on the first fitting part 11, more specifically in a central opening thereof. In the direction of the second fitting part 12 a first profiled portion 21b, a second profiled portion 21c, a second cylinder portion 21d, a third cylinder portion 21e and four driver cams 21f adjoin the first cylinder portion 21a in this sequence.

An eccentric 27 is located fixedly in terms of rotation on the first profiled portion 21b of the driver 21 which is designed to be approximately square in cross section, said eccentric being arranged in the constructional space defined between the fitting parts 11 and 12. A spring arrangement 35, for example one or two spiral springs nested in one another, is arranged in a central receiver of one of the two fitting parts 11 and 12, in the present case of the second fitting part 12, and in the present case supported externally thereon. The spring arrangement 35 acts on the eccentric 27, in the present case by being located on the inside fixedly in terms of rotation on the second profiled portion 21c of the driver 21 which is designed to be approximately square in cross section. Such a spring arrangement 35 is disclosed, for example, in DE 10 2005 046 807 B3. The eccentric 27 loaded by the spring arrangement 35, acts on the radially movable locking bars 16 and loads said locking bars such that they are forced radially outwards in order to fall into engagement with the toothed rim 17, whereby the fitting 10 is locked.

The second cylinder portion 21d of the driver 21 protrudes through a circular opening of the second fitting part 12 out of the fitting 10 so that the third cylinder portion 21e adjacent to the second cylinder portion 21d is located entirely outside the constructional space of the fitting 10 formed by the first fitting part 11 and the second fitting part 12. The external diameter of the third cylinder portion 21e is slightly smaller than the external diameter of the second cylinder portion 21d so that in the transition region between the second cylinder portion 21d and the third cylinder portion 21e, an annular surface 21s oriented perpendicular to the axis A is present.

The third cylinder portion 21e has at its end remote from the second cylinder portion 21d, a front face 21e'. Four driver cams 21f are equally distributed over the circumference of the front face 21e' and radially outwardly fastened thereto. The defining surfaces of the driver cams 21f facing radially outward are located on an imaginary extension of the outer surface of the third cylinder portion 21e and extend from the front face 21e' in the axial direction away from the third cylinder portion 21e.

In the region of the second cylinder portion 21d and the third cylinder portion 21e, a fastening ring 24 is provided on the driver 21, in the present case said fastening ring consisting of plastics and being fastened by means of ultrasonic welding to the driver 21.

A control disk 36 is axially arranged in the constructional space between the locking bars 16 and the first fitting part 11 and in the present case is located fixedly in terms of rotation on the eccentric 27. The control disk 36 has—in the present case four—control tracks which in each case cooperate with a lug 38 of each locking bar 16. The lugs 38 protrude in this case in the axial direction from the locking bars 16 assigned thereto. With a rotation (by a few degrees) of the driver 21—and the eccentric 27 driven thereby and the control disk 36—counter to the force of the spring arrangement 35 the control disk 36 pulls the locking bars 16 radially inwards i.e. out of the toothed rim 17, whereby the fitting 10 is unlocked and the two fitting parts 11 and 12 are able to be rotated relative to one another about the axis A. The backrest 4 is now pivotable about the axis A, in order to adjust its inclination, i.e. in order to adopt a different position of use.

The backrest 4 is able to be adjusted in inclination by means of the described fitting 10, i.e. it is able to adopt different positions of use. Additionally or alternatively, the backrest 4 may be freely pivoted, i.e. pivoted forward, in order to facilitate entry to a rear seat row of a two-door or three-door motor vehicle, for example, or to be transferred from the upright position of use into a horizontal table position. The fitting 10 is thus only intended to be locked in a few selected positions. It increases the operating comfort if, after having been unlocked, the fitting 10 does not have to be held during the entire pivoting process into such a selected position. To this end, in the fitting 10, between the control disk 36 and the first fitting part 11 about the axis A, an annular freely pivoting control element, not shown in the figures, is optionally provided, said control element being connected fixedly in terms of rotation to the first fitting part 11. The freely pivoting control element has stop tracks which cooperate with the lugs 38 of the locking bars 16, by limiting the movement thereof radially outwardly or by permitting said lugs to engage therein unhindered. In order to be able to pivot the backrest 4 freely by more than the angle between two locking bars 16, the lugs 38 of the locking bars 16 are alternately arranged at different intervals radially outwardly or radially inwardly on the locking bars 16 assigned thereto, so that adjacent lugs 38 cooperate with different stop tracks. Accordingly, two different embodiments of the locking bars 16 are provided. Details are described in DE 10 2006 015 560 B3.

The fastening ring 24 has a plurality of different functional regions, in the present case four. Directly axially adjacent to the second fitting part 12, the fastening ring 24 has an external profile 24a, in the present case a square with rounded corners, which is configured on the circumference of a radially protruding material part. On the free end remote from the second fitting part 12, the fastening ring 24 has a collar 24b which also protrudes radially. Radially inside the collar 24b, i.e. in a recess of the fastening ring 24, an internal profile 24c is formed, in the present case as a wedge profile with four-fold symmetry. Radially on the inside, the hollow fastening ring 24 is provided with a passage 24d which is designed to be slightly stepped in the axial direction. One of the steps is designed as an edge 24s. When mounting the fastening ring 24 on the driver 21, the passage 24d is pushed over the second cylinder portion 21d and the third cylinder portion 21e of the driver 21 until the edge 24s bears against the circumference of the annular surface 21s. At this point, during the ultrasonic welding, a circumferential welded connection is produced between the fastening ring 24 and the driver 21, as is disclosed in principle in DE 10 2008 024 853 A1. The gap shown symbolically in FIG. 4 between the annular surface 21s and the edge 24s serves only for illustration of the welding point, but is no longer present after the welding.

The outer profile 24a is provided for optional cooperation with an indicator, in a manner which is fixed in terms of rotation. The indicator is a ring with a radially protruding pointer, wherein the ring has a profile adapted to, and preferably cooperating positively with, the outer profile 24a. The indicator provides the angular position of the driver 21 and thus of the eccentric 27, which in turn is an indication of whether the locking bars 16 acted upon by the eccentric 27 are radially external or radially internal i.e. the fitting 10 is locked or unlocked.

A groove 24g is formed on the fastening ring 24, axially between the outer profile 24a and the collar 24b, said groove, for example, being 1 mm deep relative to the collar 24b. The collar 24b is provided for a clip connection with the component to be clipped on. Due to the groove 24g, the collar 24b may be engaged from behind in the axial direction in order to create the clip connection. The component to be clipped on which has one or more hook-shaped projections for cooperation with the collar 24b is, for example, an actuating lever 5.

The internal profile 24c is provided for a connection which is fixed in terms of rotation to a part acting on the driver 21, in the present case said actuating lever 5 which has a profile on a bearing portion adapted to, and preferably cooperating positively with, the internal profile 24c. The actuating lever 5 is, as a result, mounted on the fastening ring 24 by means of the bearing portion and connected fixedly in terms of rotation to the driver 21 and axially secured to the collar 24b by means of the clip connection.

The use of the functional regions described above of the fastening ring 24 (external profile 24a, collar 24b, internal profile 24c and passage 24d) require a defined angular position of the fastening ring 24 which is subject to as little tolerance as possible relative to the driver 21. In order to achieve this during the mounting process, the collar 24b of the fastening ring 24 has four first cams 24n inside the passage 24d which in the radial direction are oriented toward the axis A, and cooperate with the driver cams 21f of the driver 21. To this end, the driver cams 21f have in each case a centering surface 21f which in each case in the circumferential direction bear against a bearing surface 24n' of the first cams 24n. As a result, the angular position of the fastening ring 24 relative to the driver 21 is clearly determined before the components are connected together, preferably ultrasonically welded.

Figure 8:
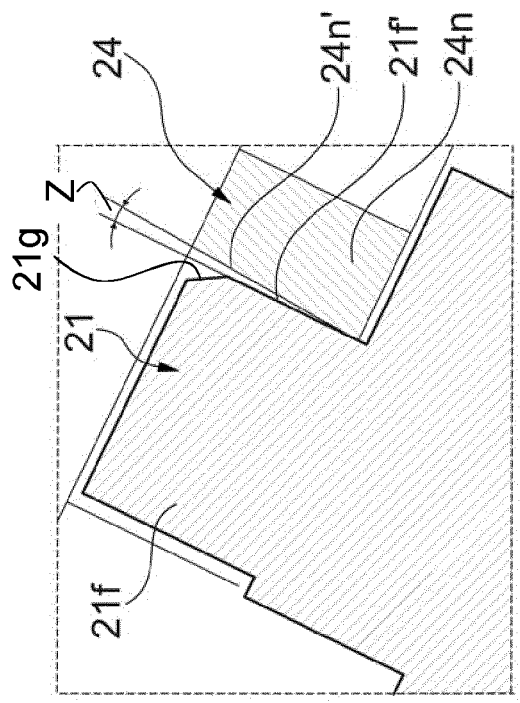
FIG. 8 is a sectional view along the line VIII-VIII in FIG. 7.
Figure 7:
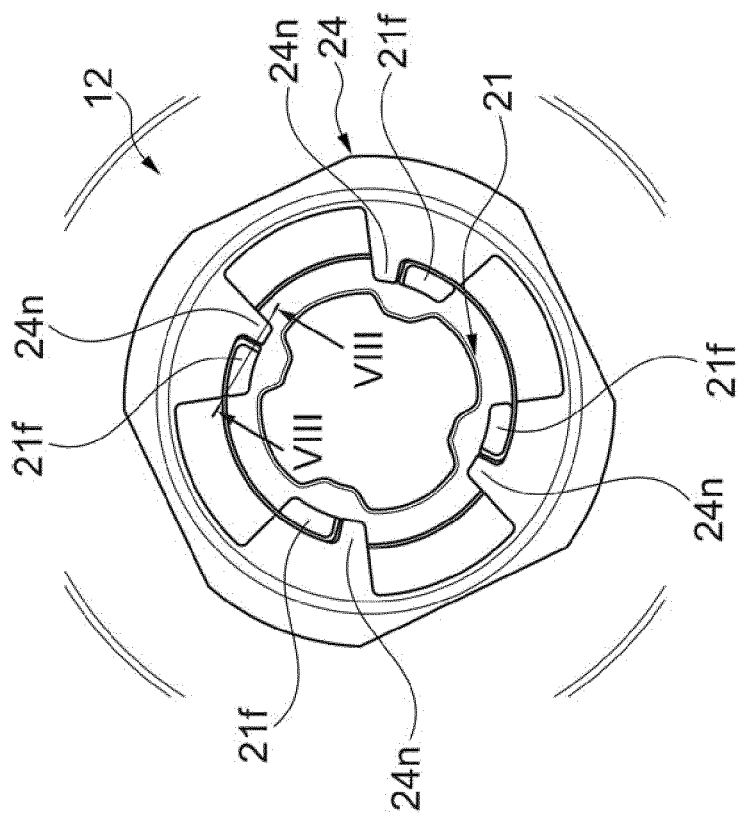
FIG. 7 is a plan view of the driver and the fastening ring.

As shown in FIG. 8, one respective centering angle Z, in the present case 4°+1-1°, is provided between the centering surface 21f and the bearing surface 24n', by the bearing surfaces 24n' being inclined in this case relative to a line parallel to the axis A about this centering angle Z, whilst the centering surfaces 21f extend axially parallel. However, modifications are also possible in which only the centering surfaces 21f are inclined or said centering surfaces are additionally inclined by an angle relative to a line parallel to the axis A.

In a further modification of the exemplary embodiment, the bearing surface 24n' in the axial direction is only inclined in a first partial portion in regions relative to a line parallel to the axis A. A second partial portion extending parallel to the axis A in the mounted state is parallel to and in contact with the centering surface 21f.

The driver cam 21f has on its end remote from the front face 21e', on its internal edge, a circumferential chamfer 21g, which serves for centering the fastening ring 24 when the fastening ring 24 is first pushed onto the driver 21.

Figure 9A:
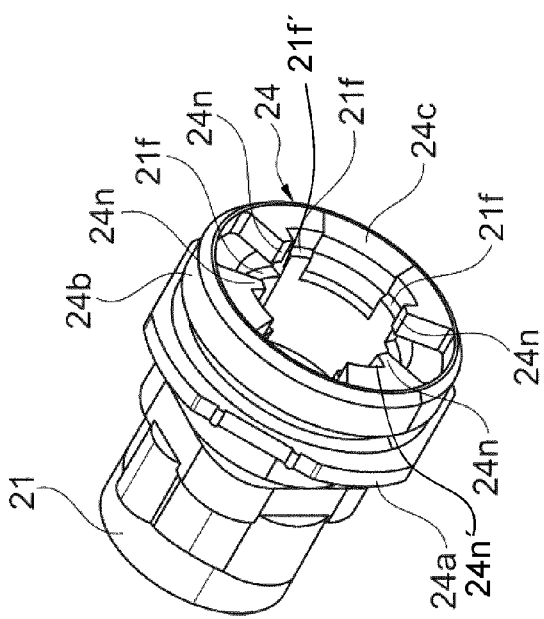
FIG. 9*a* is a perspective view of the fastening ring when first pushed onto the driver.
Figure 9B:
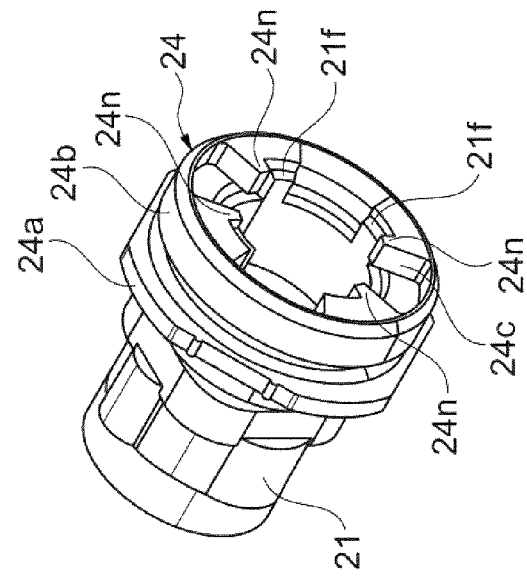
FIG. 9*b* is a perspective view of the fastening ring during the process of being pushed onto the driver.
Figure 9C:
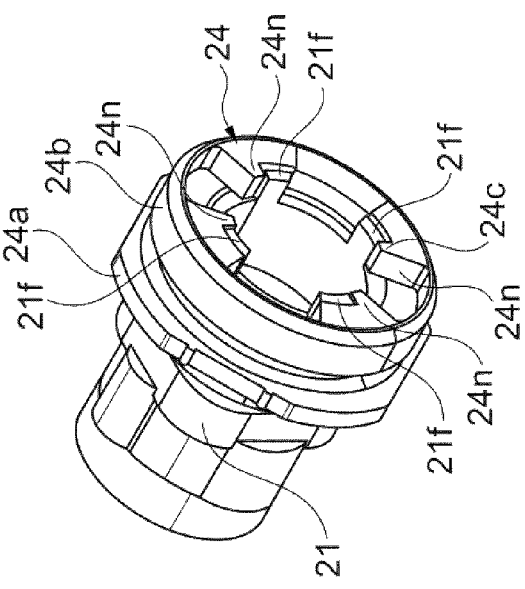
FIG. 9*c* is a perspective view of the fastening ring fully mounted on the driver.

While pushing the fastening ring 24 onto the driver 21, shown in FIGS. 9a to 9c, a slight relative angular deviation about the axis A which is potentially present may be compensated by the bearing surfaces 24n' of the first cams 24n inclined by the centering angle Z sliding along the inclined centering surfaces 21f when pushed in the axial direction onto the centering surfaces 21f of the driver cams 21f, and as a result being rotated into the correct angular position.

Optimal centering in both circumferential directions is achieved by two cam pairs being provided, in each case consisting of a driver cam 21f and a first cam 24n, wherein the driver cams 21f and the first cams 24n bear against one another in the respectively opposing circumferential direction. To this end, the cam pairs are configured mirror-symmetrically relative to one another.

To this end the fastening ring 24 preferably has three or more, in the present case six, second cams 24m which protrude inwardly in the passage 24d in the region of the outer profile 24a in the radial direction and in the mounted state of the fitting 10 bear against the second cylinder portion 21d of the driver 21. As a result, in the mounting process the fastening ring 24 when pushed onto the driver 21 in the radial direction is positioned exactly opposite the driver 21. During the mounting process, initially the second cams 24m pass the outer face of the third cylinder portion 21e, which has a slighter smaller diameter relative to the second cylinder portion 21d. If the first cams 24n already cooperate with the driver cams 21f to align the relative angular position of the driver 21 and fastening ring 24, the second cams 24m come into contact with the second cylinder portion 21d and center the driver 21 and the fastening ring 24 in the radial direction relative to one another, by elastic and/or plastic deformation of the second cams 24m.

Adjacent to the second cams 24m a small gap exists between the fastening ring 24 and the driver 21, said gap, in particular, being filled with weld deposit produced during the ultrasonic welding process.

While specific embodiments of the invention have been shown and described in detail to illustrate the application of the principles of the invention, it will be understood that the invention may be embodied otherwise without departing from such principles.

The invention claimed is:

1. A fitting for a motor vehicle seat, the fitting comprising:
   a first fitting part with a toothed rim formed on the first fitting part;
   a second fitting part with guide segments formed on the second fitting part, the first fitting part and the second fitting part being rotated about an axis relative to one another;
   locking bars displaceably guided, via the guide segments, between a locked state and an unlocked state, the locking bars cooperating with the toothed rim in the locked state to lock the fitting;
   a spring-loaded, rotatably mounted, eccentric acting on the locking bars to bring the locking bars into cooperation with the toothed rim;
   a rotatably mounted driver for rotating the eccentric, the driver having at least one driver cam;
   a fastening ring configured separately from the driver and connected fixedly to the driver;
   at least one fastening ring cam formed on the fastening ring and bearing in a circumferential direction against the at least one driver cam of the driver, the fastening ring comprising a collar with a passage about the axis and the at least one fastening ring cam being provided within the passage such that the at least one fastening ring cam is oriented in the radial direction toward the axis, wherein the at least one driver cam has a centering surface which in the circumferential direction bears against a bearing surface of the at least one fastening ring cam.

2. A fitting as claimed in claim 1, wherein the at least one driver cam protrudes in an axial direction from a front face of the driver.

3. A fitting as claimed in claim 2, wherein the at least one driver cam, at an end of the at least one driver cam that is remote from the front face, has a circumferential chamfer on an internal edge thereof.

4. A fitting as claimed in claim 1, wherein a centering angle of 6°+/−4°, is provided between the centering surface and the bearing surface, at least in regions.

5. A fitting as claimed in claim 4, wherein the bearing surface is inclined in the axial direction relative to a line parallel to the axis in a first partial portion and is configured to extend parallel to the axis in a second partial portion, the centering angle only being present in the first partial portion and the centering surface and the bearing surface of the fitting, in a fully mounted state, only bearing against one another in the second partial portion.

6. A fitting as claimed in claim 1, wherein:
the at least one driver cam and the at least one fastening ring cam form a cam pair;
at least two cam pairs are provided, consisting in each case of one of the driver cams and one of the fastening ring cams;
the driver cams and the fastening ring cams of the at least two cam pairs bear against one another in the respective opposing circumferential direction, with the at least two cam pairs being configured mirror-symmetrically relative to one another.

7. A fitting as claimed in claim 1, wherein the fastening ring is connected to the driver by an ultrasonic weld formed by means of ultrasonic welding.

8. A fitting as claimed in claim 1, wherein the fastening ring has at least one second fastening ring cam which bears against the driver in the radial direction.

9. A fitting as claimed in claim 8, wherein the fastening ring has exactly three second fastening ring cams which bear against the driver in the radial direction.

10. A fitting as claimed in claim 8, wherein the fastening ring has exactly six second fastening ring cams which bear against the driver in the radial direction.

11. A fitting as claimed in claim 8, wherein a gap is present between the fastening ring and the driver adjacent to the at least one second fastening ring cam.

12. A fitting as claimed in claim 11, wherein the gap is filled with weld deposit.

13. A fitting as claimed in claim 1, wherein an edge of the passage circulating around the axis bears, in a bearing region of the fastening ring, against an annular surface of the driver extending annularly around the axis and is welded to the driver in the bearing region of the fastening ring.

14. A motor vehicle seat comprising a fitting, the fitting comprising:
a first fitting part with a toothed rim formed on the first fitting part;
a second fitting part with guide segments formed on the second fitting part, the first fitting part and the second fitting part being rotated about an axis relative to one another;
locking bars displaceably guided, via the guide segments, between a locked state and an unlocked state, the locking bars cooperating with the toothed rim in the locked state to lock the fitting;
a spring-loaded, rotatably mounted, eccentric acting on the locking bars to bring the locking bars into cooperation with the toothed rim;
a rotatably mounted driver for rotating the eccentric, the driver having at least one driver cam;
a fastening ring configured separately from the driver and connected fixedly to the driver;
at least one fastening ring cam formed on the fastening ring and bearing in a circumferential direction against the at least one driver cam of the driver, the fastening ring comprising a collar with a passage about the axis and the at least one fastening ring cam being provided within the passage such that the at least one fastening ring cam is oriented in the radial direction toward the axis, wherein the at least one driver cam has a centering surface which in the circumferential direction bears against a bearing surface of the at least one fastening ring cam.

15. A motor vehicle seat as claimed in claim 14, wherein the at least one driver cam protrudes in an axial direction from a front face of the driver.

16. A motor vehicle seat as claimed in claim 14, wherein a centering angle of 6°+/−4°, is provided between the centering surface and the bearing surface, at least in regions.

17. A motor vehicle seat as claimed in claim 16, wherein the bearing surface is inclined in the axial direction relative to a line parallel to the axis in a first partial portion and is configured to extend parallel to the axis in a second partial portion, the centering angle only being present in the first partial portion and the centering surface and the bearing surface of the fitting, in a fully mounted state, only bearing against one another in the second partial portion.

18. A motor vehicle seat as claimed in claim 14, wherein:
the at least one driver cam and the at least one fastening ring cam form a cam pair;
at least two cam pairs are provided, consisting in each case of one of the driver cams and one of the fastening ring cams;
the driver cams and the fastening ring cams of the at least two cam pairs bear against one another in the respective opposing circumferential direction, with the at least two cam pairs being configured mirror-symmetrically relative to one another.

* * * * *